United States Patent
Christensen

(10) Patent No.: US 6,309,338 B1
(45) Date of Patent: Oct. 30, 2001

(54) METHOD AND PLANT FOR THE TREATMENT AND STABILIZATION OF MATERIALS CONTAINING ENVIRONMENTALLY NOXIOUS CONSTITUENTS

(75) Inventor: Thomas Højlund Christensen, Farum (DK)

(73) Assignee: Babcock & Wilcox Volund ApS (DK)

( * ) Notice: Subject to any disclaimer, the term of this patent is extended or adjusted under 35 U.S.C. 154(b) by 0 days.

(21) Appl. No.: 09/242,928

(22) PCT Filed: Aug. 27, 1997

(86) PCT No.: PCT/DK97/00350

§ 371 Date: Feb. 26, 1999

§ 102(e) Date: Feb. 26, 1999

(87) PCT Pub. No.: WO98/08628

PCT Pub. Date: Mar. 5, 1998

(30) Foreign Application Priority Data

Aug. 28, 1996 (DK) .................................................... 0907/96

(51) Int. Cl.⁷ ................................. A62D 3/00; B09B 3/00
(52) U.S. Cl. ....................... 588/257; 210/195.1; 210/202; 405/129.25; 405/129.27; 405/129.3; 588/256 588/259
(58) Field of Search ................................ 210/195.1, 202, 210/710, 713, 722; 588/249, 253, 256, 257, 259; 405/129.25, 129.27, 129.3, 128

(56) References Cited

U.S. PATENT DOCUMENTS

| 3,617,562 | * | 11/1971 | Cywin | 210/718 |
|---|---|---|---|---|
| 4,648,975 | * | 3/1987 | Barkatt et al. | 210/656 |
| 4,948,516 | * | 8/1990 | Fisher et al. | 405/128 |
| 5,202,033 | | 4/1993 | Stanforth et al. . | |
| 5,285,000 | * | 2/1994 | Schwitzgebel | 588/256 |
| 5,298,168 | * | 3/1994 | Guess | 210/713 |
| 5,304,710 | * | 4/1994 | Kigel et al. | 588/257 |
| 5,403,496 | * | 4/1995 | Kramer et al. | 210/710 |
| 5,649,895 | * | 7/1997 | Fix et al. | 588/256 |

FOREIGN PATENT DOCUMENTS 52 05 096  8/1993  (DE) .
0 482 718  10/1991  (EP) .

OTHER PUBLICATIONS

WPI/Derwent's abst., No. 87–266630, wk 8738, Abst of JP, 62183896, Kawasaki Heavy Ind Ltd. 8/123/87.

* cited by examiner

Primary Examiner—George Suchfield
(74) Attorney, Agent, or Firm—Larson & Taylor, PLC

(57) ABSTRACT

In a method for the treatment, in particular stabilization, of materials containing environmentally noxious constituents, especially from the incineration of waste, in which the materials are treated with ferrous compounds and water, the materials are washed and stabilized chemically using a solution containing ferrous ions ($Fe^{++}$) which allows the formation of stabilizing ferric oxides ($Fe^{+++}$) on the materials, the ferric oxide formation being carried out by means of an oxidation under controlled conditions with respect to the nature and the amount of oxidizing agent, temperature and pH, whereafter, if desired, the treated materials are subjected to a thermal after-treatment. A plant for carrying out the said method comprises a silo (2) containing materials containing environmentally noxious constituents; a reactor (1) to which the said materials ar fed; a tank (9) and a return water tank (7) and silos (3, 4) containing ferrous salt solution and, if desired, other chemicals, washing-water and the said chemicals being fed to the said reactor (1), the reactor contents being stirred; a sedimentation tank (5) to which the washing-water is fed; a centrifuge or filter press (6) in which the precipitate formed is dewatered; and means for aerating the water in the said tank (5) for decreasing the pH and oxidation of the water.

24 Claims, 1 Drawing Sheet

Figure 1:
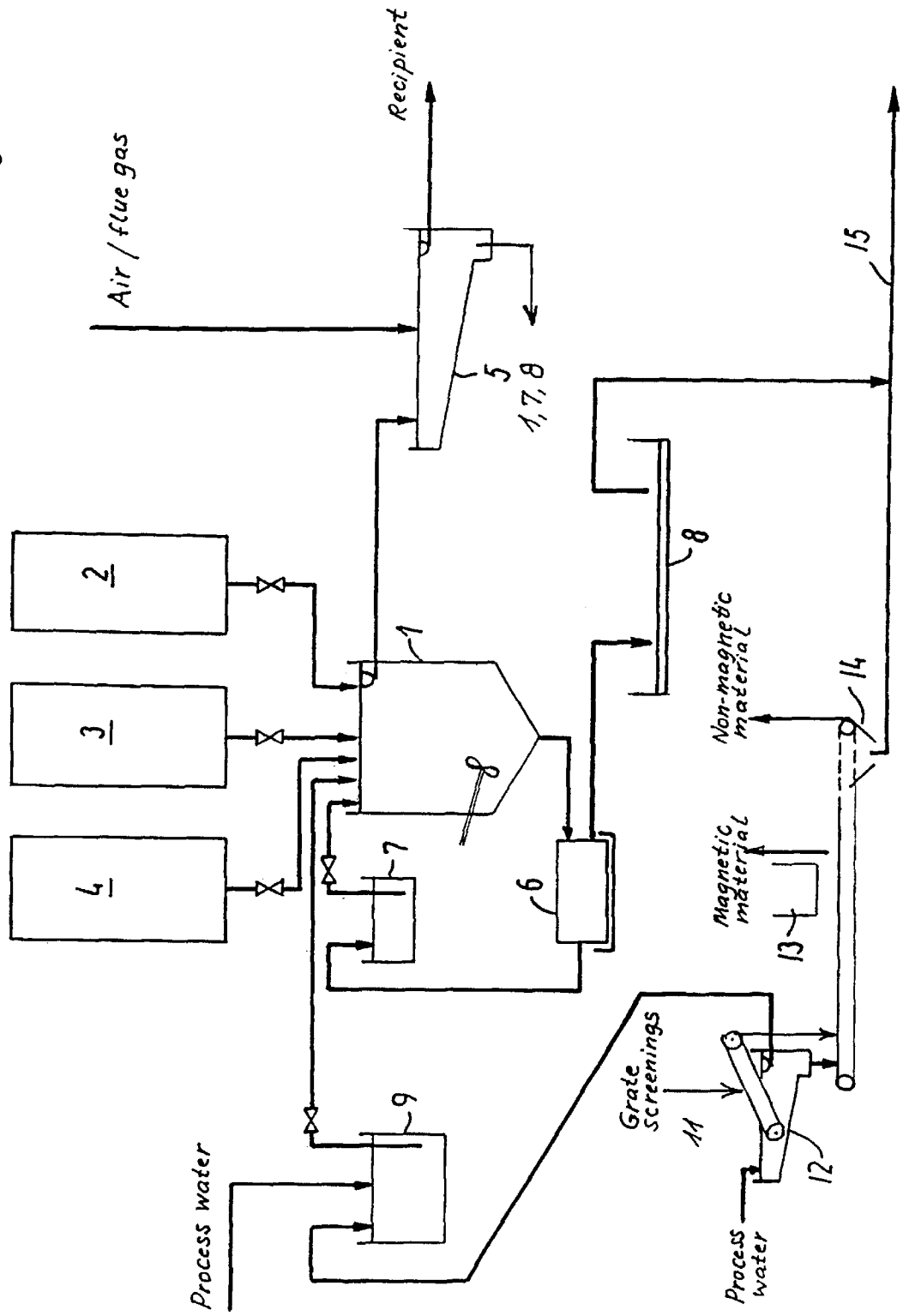

METHOD AND PLANT FOR THE TREATMENT AND STABILIZATION OF MATERIALS CONTAINING ENVIRONMENTALLY NOXIOUS CONSTITUENTS

TECHNICAL FIELD

This invention relates to a method for the treatment, in particular stabilization of materials containing environmentally noxious constituents, especially from waste incineration plants for protection against the release of environmentally foreign or environmentally noxious compounds during transport, use or disposal of the stabilized material. The method combines a washing-out of salts with the formation of coatings on the surfaces of the particles whereby the release of salts, metals etc. from the particles is reduced, and the treated material can therefore more easily be reused or landfilled, and, if desired, a subsequent thermal treatment of the coated product formed by the coating, e.g. in the incineration plant, in order to obtain in the plant a sintering together with the slag.

The washing-out is carried out by means of a ferrous solution whereafter the material is oxidized so that the ferrous iron used with the material forms coatings of ferric oxides on the material and thereby immobilizes heavy metals in particular. The salt containing washing-water is also oxidized, whereby the metal ion content, if any, is reduced substantially by the sedimentation of ferric oxides. The method results in a stabilized solid product and a fairly pure salt solution. The method can be used in connection with all granular materials, which contain environmentally noxious compounds, such as slag, fly ash, flue gas cleaning products, sludge ash, industrial dust, contaminated soil or combinations thereof, in particular however in connection with residuals from waste incineration plants.

BACKGROUND ART

By the incineration of waste, a reduction of the amount of waste is obtained, and it is made possible to use the released energy for power and/or heating purposes, but at the same time there is obtained a concentration of environmentally foreign or environmentally noxious constituents, such as heavy metals, in the ash and the other solid particle fractions, and a flue gas which also carries hazardous compounds, both mineral and organic, such as halogen compounds, is also obtained.

The flue gas from the incineration can be cleaned with respect to solid as well as gaseous contaminating constituents by means of various known methods whereby further particle fractions of flue gas cleaning products (FCP) can be produced.

When ash fractions and other by-products from the incineration of waste are used or landfilled, a dissolution and leaching of the environmentally foreign or environmentally noxious compounds can take place resulting in a contamination of the environment.

This effect can be removed or reduced to an acceptable level by extracting the environmentally noxious compounds for reuse or disposal of reduced volumes, or the compounds can be immobilized by coating the particles and/or binding the compounds chemically by means of additives or thermal treatment.

It is known to return boiler ash, filter ash, flue gas cleaning products and grate screenings and to sinter or melt these materials together with the slag, e.g. by introducing them in the rotary kiln inlet in a grate/rotary kiln plant.

Likewise, much experience has been obtained by melting together various of these fractions in order to obtain stabilized materials.

Processes are known for extracting, with e.g. acid containing water, a series of metals from the ash products, which are thereafter made into briquettes for being returned to the incineration plant so that the material can form part of the slag.

It is also known to add cement, silicates, iron oxide or phosphate, whereby the materials are stabilized markedly with respect to the washing-out of heavy metals.

Thus, it is possible to achieve that certain residual products or materials can be used as secondary building materials or be deposited.

For more detailed descriptions of the said methods reference is made to the literature, e.g. the references cited in the following.

However, the ash from waste incineration plants is typically subject to such variations that it has been difficult to provide a safe and economical method for securing the reuse of the ash products.

In the method known from the Danish Patent Application No. 6379/89 there is, in principle, also used ferrous compounds in connection with stabilization. In this method aluminum silicates, lime, ferrous iron and water are mixed to a liquid mass and subsequently dried to a concrete-like solid waste product, but this method does not comprise a washingout step, and ferrous iron is only one of several stabilizing chemicals which lead to the formation of a concrete-like product.

Likewise, it is known from Japanese Patent Application No. J 62183896 that coal ash can be treated with iron containing compounds in order to improve the utility of the ash, but also this method does not comprise a combination with washing-out or subsequent oxidation and, if desired, thermal treatment.

From e.g. EP Patent No. 0 536 268 B1 it is known to introduce ashes and other flue gas cleaning products in the combustion zone of a waste incineration plant for thereby obtaining a melting together with the slag and thereby an immobilization of heavy metals etc. in the slag, but one may hereby obtain an undesired release of noxious constituents to the flue gas, e.g. Pb, Hg, As and Zn.

It is the main object of the invention to provide such a safe and economical method for the stabilization of the residual products from waste incineration that they can be used without risk as filling materials or be landfilled without contamination of the environment.

It is also an object of the invention to provide a plant for carrying out the said method.

DISCLOSURE OF THE INVENTION

According to the invention there is provided a method as defined for the treatment of materials containing environmentally noxious constituents by combining washing-out and stabilization, and by this combination there is obtained a substantial stabilization of the metal compounds in the material by the formation of iron oxide coatings on the particles as well as a substantial washing-out of salts, avoiding that the salt-containing washing-water after the process contains substantial concentrations of especially metals. By means of an optional subsequent thermal treatment in an incineration plant there can be obtained a further stabilization of the residual product by sintering/melting together with the other slag in the plant.

This is obtained by means of a method of the type defined above, the said method being characterized by the features set forth in the claims. Preferred and/or special embodiments of the method are defined in the dependent method claims.

The invention also comprises a plant for carrying out the method of the present invention, the said plant being characterized by a silo containing materials containing environmentally noxious constituents; a reactor to which the said materials are fed; a tank and a return water tank and silos containing ferrous salt solution and, if desired, other chemicals, washing-water and the chemicals being fed to the reactor, the reactor contents being stirred; a sedimentation tank to which the washing-water is fed; a centrifuge or filter press in which the precipitate formed is dewatered; and means for aerating the water in the tank for decreasing the pH and oxidation of the water. Preferred and/or special embodiments of the plant are defined in the dependent plant claims.

The material to be stabilized is mixed in a reactor in a solution containing 0.2 to 5% of ferrous iron in an L/S ratio (liquid/solid) between 1 and 10, preferably 2–5, a pH regulation possibly being required for obtaining a pH in the mixture in the interval from 5 to 12, in particular from 8 to 11.7 additionally, stabilization may be carried out with other chemicals such as silicon (Si), aluminum (Al) and phosphate ($Po_4^{-3}$). The L/S ratio is adapted to inter alia the properties of the residual material in question, including the amount of easily soluble salts which must and can be washed out, and the porosity, particle size distribution and types of the material. The actual plant used can also influence the L/S ratio used.

The concentration of ferrous iron ($Fe^{++}$) in the solution depends inter alia on the L/S ratio at which the plant is operated, and on the properties of the residual product and the requirement for coating. The ferrous solution is preferably based on ferrous sulphate and/or ferrous chloride. If desired, the access of oxidizing agents to the mixture is restricted so that the oxidation of ferrous iron is limited and the ferrous ions have time for binding to the particle surfaces (10 minutes to 5 hours if a batch arrangement is used). Washing-water and residual solid material are separated by traditional methods such as sedimentation, centrifugation, filtering or combinations thereof.

The solid material is then oxidized and eventually heat treated under controlled conditions for the formation of iron oxide coatings consisting of goethite, hematite, magnetite, amorphous iron oxides or mixtures thereof. Furthermore, after being coated once, the material may be subsequently combined with an additional coating such as cement, fly ash or lime. Dependent on the composition of the starting material and critical requirements of the treated product there can be used various oxidizing agents (e.g. air, oxygen, oxygen containing flue gas, hydrogen peroxide, ozone, chlorine, permanganate, dichromate), various oxidation periods (up to 200 days) and various temperatures (0° C. to 1300° C., preferably 5° C. to 1300° C. or 0° C. to 1200° C.). These factors will influence the types of iron oxides formed on the particles. Preferably air is used as the oxidizing agent. The optional thermal treatment can be carried out in several steps, e.g. a treatment at 70° C. to 90° C. in order to obtain stable ferric compounds, and a treatment at high temperature, e.g. 800° C. to 1300° C., in furnace for obtaining melting or sintering with other products.

The washing-water is then oxidized. Dependent on other conditions further addition of ferrous solution and/or regulation of pH may be necessary, so that the washing-water after finished oxidation and separation of particles/sludge does not contain substantial amounts of non-acceptable compounds and has a pH which does not limit its use and/or discharge. The oxidation can be carried out with air, oxygen, oxygen containing flue gas, hydrogen peroxide, ozone, chlorine, permanganate or dichromate, preferably with air. By the oxidation, ferric oxides are formed which will bind the metal compounds from the washing-water. The separated particle/sludge fractions are optionally mixed with the stabilized residual product.

In connection with drying and/or thermal treatment of the treated residual products it can be expedient to perform a size reduction thereof to obtain a further stabilization.

By reintroducing the problematic particle fractions in the combustion furnace the environmentally foreign compounds can be destructed, or they can be integrated in the slag and thereby be encapsulated: the organic compounds such as PAH (polyaromatic hydrocarbons), dioxins and furanes are decomposed, and more heavy metals are bound in the silicate matrix of the ash, but a part of the metals such as Pb, Cd, Hg and Zn can partly evaporate again before they become bound and thereby give rise to an increased emission of trace substances.

By means of the present invention it is possible to decrease this evaporation of metals in connection with the sintering/melting together with the bottom slag and further to minimize the washing-out of the compounds at the later use or landfilling.

The stabilized residual products are fed to the grate (if the combustion furnace is a grate furnace) or to the rotary kiln inlet (if both a grate furnace and a rotary kiln are used) so that there is obtained a sintering together of these materials with the slag, while the volatile metals to a substantial degree remain chemically bound in the material after the thermal extra-treatment, so that the total slag can still easily be used as a secondary building material, e.g. as a foundation material for roadbuilding. Hereby there is obtained a minimizing or removal of those amounts of residual products from waste incineration which are to be landfilled. The return to the grate can, if desired, be carried out through the grate screenings return systems with which the combustion furnace can be provided. Grate screenings collection systems are preferably transport systems in which the materials are transported partly under water. They may, if desired, be provided with separation equipment which separates certain materials for reuse and e.g. separates magnetic and possible non-magnetic materials. The stabilized by-products are then preferably fed into the transport system after such a sorting has taken place.

According to a special embodiment of the invention the washing-out can take place in situ thereby that the washing solution infiltrates the material, and this can be especially relevant in connection with landfilled materials and contaminated soil. This embodiment provides less possibility of controlling the temperature, but will, on the other hand, require less handling.

BRIEF DESCRIPTION OF THE DRAWING AND OF A PREFERRED EMBODIMENT

The present invention will be described in more detail in the following in connection with a preferred embodiment, reference being made to the drawing in which FIG. 1 is a schematic illustration of a plant according to the invention in which the method of the invention can be carried out.

Description of a preferred embodiment based on a batchwise treatment of the residual product:

The dry residual products which are collected in one or more silos 2 are dosed to reactor 1 to which there are also fed washing-water from a water tank 9 and a return water tank 7 as well as chemicals such as ferrous sulphate hydrate ($FeSO_4$, n $H_2O$) and optionally other chemicals from silos 3 and 4 with stirring. The stirring is performed preferably for 10 to 20 minutes, whereafter the solid phase is sedimented, before the washing-water is passed to a sedimentation tank 5, and the precipitate is dewatered by being passed to e.g. a centrifuge or filter press 6. The water in the sedimentation tank 5 is treated by means of aeration to obtain a decrease in pH and aeration of the water. Preferably purified flue gas is used for aeration, since the high carbon dioxide content can be used for the pH regulation which can also be carried out by the addition of acid. A precipitate in the sedimentation tank 5 can be returned to the process in the reactor 1, the return water tank 7 or a drying and/or aeration station 8. Following treatment and sedimentation of particles the water can typically be passed directly to a recipient which allows discharge of water with dissolved salts.

In the centrifuge or filter press 6 additional water is separated and returned to the process in the reactor 1 through the return water tank 7, while the treated product is passed through the drying and/or aeration station 8 where a further drying of the product takes place. If desired, the treated product is then passed on to the incineration plant, and this is preferably done by feeding it to a grate screenings system 15.

The process water used for the chemical treatment of the residual product in the reactor 1 is supplied from the water tank 9 and the return water tank 7. The water may be collected process water from other systems, e.g. from quenching and washing-out of soluble salts such as chlorides from grate screenings 11 and 12, or from quenching and washing-out of slag.

The chemically treated product must, if ferrous salts are used for stabilization, be subjected to an oxidation of the ferrous compounds to ferric oxides for obtaining the desired stabilization. This oxidation can take place in a separate drying plant or in the station 8 during a thermal treatment in the incineration plant, or it can take place at both positions.

The product is preferably, if it is fed to the incineration furnace through the grate screenings return system, supplied after an optional separation of magnetic material 13 and non-magnetic, coarse materials 14.

The invention is described further in the following according to another embodiment being carried out in the laboratory with subsequent measurement of the washing-out from a treated and an untreated flue gas cleaning product from waste incineration, respectively.

EXAMPLE

Flue gas cleaning product (FCP) from a waste incineration plant with a semi-dry flue gas cleaning process is mixed with an L/S-ratio (liquid solid) of 5 with a ferrous sulphate solution corresponding to 10 grams of Fe per 100 grams of RRP. The mixing takes place under oxygen-free conditions and stirring for about 10 minutes. Thereafter, liquid and solid materials are separated by sedimentation and filtering.

The solid material is left for 8 days in a drying chamber whereby ferrous iron bound to the solid material is oxidized and forms reddish brown coatings of iron oxides on the particles. The material is then left for 2 weeks before being subjected to a leaching test in a column. The washing-water is aerated by blowing in air for 24 hours whereby pH drops to about 7.5 and the concentration of lead to <0.01 mg per liter. The amount of sludge (<1% of FCP) is mixed with the treated FCP.

The treated FCP is filled in two columns in the laboratory and flushed with water in order to illustrate the washing-out from the material. For comparison purposes two columns of the untreated FCP are made as well. The results for the treated FCP are shown in Table 1 and 2, while the results for the untreated RRP appear from Table 3 and 4. The LUS ratio shows how much water (L) which has run through the column, in relation to the amount of FCP (S) in the column. For lead which is one of the more critical parameters in this context the washing-out has been reduced in the treated FCP with more than a factor 100.

Table 1 and 2: Concentration of lead and other parameters in the effluent from two duplicated columns containing treated FCP from a waste incineration plant. The L/S ratio defines the amount of water which has run through the column in relation to the amount of material in the column.

TABLE 1

| L/S | pH | Pb [ppb] | Fe [ppm] | Cu [ppm] | Zn [ppm] | Ca [ppm] |
|---|---|---|---|---|---|---|
| 0–0.25 | 7.4 | 293 | 1.9 | 0.3 | 2.2 | 23700 |
| 0.25–0.50 | 7.7 | 29 | 0.8 | 0.1 | 0.2 | 13000 |
| 0.50–0.74 | 8.1 | 16 | 1.4 | <0.1 | 0.1 | 2600 |
| 1.38–1.61 | 8.6 | 3 | <0.1 | <0.1 | <0.1 | 270 |
| 1.61–1.82 | 8.6 | 2 | <0.1 | <0.1 | <0.1 | 650 |
| 1.82–2.03 | 9.0 | 3 | <0.1 | <0.1 | <0.1 | 620 |
| 2.89–3.10 | 9.0 | 7 | <0.1 | <0.1 | <0.1 | 620 |
| 3.10–3.34 | 9.1 | 2 | <0.1 | <0.1 | <0.1 | 600 |
| 3.35–3.55 | — | 1 | <0.1 | <0.1 | <0.1 | 610 |
| 3.55–3.78 | — | 1 | <0.1 | <0.1 | <0.1 | 620 |
| 4.38–4.60 | 9.3 | 13 | <0.1 | <0.1 | <0.1 | 620 |
| 4.60–4.84 | 9.4 | 2 | <0.1 | <0.1 | <0.1 | 500 |
| 4.84–5.08 | 9.3 | 2 | <0.1 | <0.1 | <0.1 | 560 |
| 5.08–5.32 | 9.4 | 5 | <0.1 | <0.1 | <0.1 | 590 |

TABLE 2

| L/S | pH | Pb [ppb] | Fe [ppm] | Cu [ppm] | Zn [ppm] | Ca [ppm] |
|---|---|---|---|---|---|---|
| 0–0.12 | 6.3 | 900 | 2.3 | <0.1 | 1.5 | 40600 |
| 0.12–0.31 | 7.1 | 150 | 1.4 | 0.3 | 3.8 | 21900 |
| 0.31–0.53 | 7.6 | 16 | 0.6 | <0.1 | 0.5 | 8300 |
| 1.07–1.28 | 8.1 | 22 | <0.1 | <0.1 | <0.1 | 610 |
| 1.28–1.50 | 8.3 | <1 | <0.1 | <0.1 | <0.1 | 660 |
| 1.50–1.73 | 8.3 | <1 | <0.1 | <0.1 | <0.1 | 580 |
| 1.73–1.94 | 8.3 | 3 | <0.1 | <0.1 | <0.1 | 490 |

Table 3 and 4: Concentration of lead and other parameters in the effluent from two duplicated columns containing untreated FCP from a waste incineration plant. The L/S ratio defines the amount of water which has run through the column in relation to the amount of material in the column.

TABLE 3

| L/S | pH | Pb [ppb] | Fe [ppm] | Cu [ppm] | Zn [ppm] | Ca [ppm] |
|---|---|---|---|---|---|---|
| 0.00–0.15 | — | 1000000 | 240 | 22 | 505 | 48200 |
| 0.15–0.47 | — | 46000 | 23 | 0.7 | 82 | 17400 |
| 0.47–0.71 | 11.8 | 7800 | 1.8 | 0.3 | 52 | 4200 |
| 0.98–1.19 | 12.6 | 330 | 0.1 | <0.1 | 2.4 | 1800 |
| 1.19–1.41 | 12.3 | 330 | 0.1 | <0.1 | 2.3 | 980 |
| 1.41–1.62 | 12.4 | 210 | 0.3 | <0.1 | 2.1 | 70 |
| 1.62–1.84 | 12.6 | 210 | 0.2 | <0.1 | 2.4 | 900 |
| 1.84–2.06 | 12.3 | 330 | 0.3 | <0.1 | 2.2 | 1090 |
| 2.34–2.43 | 12.4 | 330 | 0.1 | <0.1 | 1.6 | 790 |
| 2.43–2.62 | 12.7 | 210 | <0.1 | <0.1 | 1.8 | 500 |
| 2.62–2.81 | 12.6 | 330 | 0.1 | <0.1 | 2.0 | 1000 |
| 3.59–3.78 | 12.5 | 330 | <0.1 | <0.1 | 1.5 | 870 |

TABLE 3-continued

| L/S | pH | Pb [ppb] | Fe [ppm] | Cu [ppm] | Zn [ppm] | Ca [ppm] |
|---|---|---|---|---|---|---|
| 3.78–4.00 | 12.8 | 330 | 0.1 | <0.1 | 1.9 | 900 |
| 4.00–4.17 | — | 330 | 0.2 | <0.1 | 2.1 | 900 |
| 4.17–4.38 | — | 330 | 0.1 | <0.1 | 2.0 | 850 |
| 4.88–5.08 | 12.5 | 440 | <0.1 | <0.1 | 1.9 | 770 |
| 5.08–5.29 | 12.5 | 440 | <0.1 | <0.1 | 1.8 | 740 |
| 5.29–5.50 | 12.5 | 440 | <0.1 | <0.1 | 1.8 | 840 |
| 5.50–5.70 | 12.5 | 440 | <0.1 | <0.1 | 1.6 | 610 |

TABLE 4

| L/S | pH | Pb [ppb] | Fe [ppm] | Cu [ppm] | Zn [ppm] | Ca [ppm] |
|---|---|---|---|---|---|---|
| 0.00–0.15 | — | 420000 | 211 | 12 | 516 | 82900 |
| 0.15–0.22 | — | 90000 | 17 | 0.5 | 27 | 53600 |
| 0.22–0.35 | 11.0 | 80000 | 17 | 0.7 | 39 | 46900 |
| 0.35–0.39 | 10.8 | 60000 | 3.7 | 0.5 | 31 | 26100 |
| 0.39–0.46 | 11.1 | 70000 | 3.7 | 0.5 | 7.1 | 32000 |
| 0.46–0.53 | 11.3 | 70000 | 2.9 | 0.4 | 1.8 | 30600 |
| 0.53–0.59 | 11.3 | 50000 | 2.6 | 0.4 | 13 | 7180 |
| 0.69–0.79 | 12.1 | 7200 | 1.0 | 0.2 | 5.6 | 14400 |
| 0.79–0.97 | 12.3 | 3400 | 0.5 | <0.1 | 3.9 | 6700 |
| 0.97–1.15 | 12.5 | 1400 | 0.2 | <0.1 | 3.3 | 2600 |
| 1.89–2.08 | 12.5 | 670 | 0.1 | <0.1 | 1.6 | 820 |
| 2.08–2.25 | 12.8 | 560 | 0.1 | <0.1 | 1.8 | 110 |
| 2.25–2.43 | — | 670 | <0.1 | <0.1 | 2.0 | 480 |
| 2.43–2.64 | — | 560 | <0.1 | <0.1 | 1.9 | 240 |
| 3.16–3.36 | 12.6 | 560 | <0.1 | <0.1 | 1.8 | 720 |
| 3.36–3.56 | 12.5 | 560 | <0.1 | <0.1 | 1.8 | 450 |
| 3.56–3.78 | 12.5 | 440 | <0.1 | <0.1 | 1.6 | 25 |
| 3.78–3.99 | 12.6 | 560 | 0.2 | <0.1 | 1.6 | 340 |

References

1. J. Flyvbjerg & O. Hjelmar, 1996: Restprodukter fra røggasrensningen ved affaldsforbrænding: Udredning af muligheder for oparbejdning, genanvendelse og deponering. Udarbejdet af Vandkvalitetsinstituttet for Miljøstyrelsens genanvendelsesråd, København.
("Residual products from the flue gas cleaning by waste incineration: Survey of possibilities for treatment, reuse and deposit. Prepared by the Water Quality Institute for the Environment Authority's Council for Reuse, Copenhagen"). 2. J. J. J. M. Goumans, H. A. van der Sloot & Th. G. Aalbers: Waste Materials in Construction, Proceedings of the International Conference on Environmental Implications of Construction with Waste Materials, Maastricht, The Netherlands, Nov. 10–14, 1991, Elsevier, Amsterdam London New York Tokyo 1991.

What is claimed is:

1. A method for treatment of materials containing environmentally noxious constituents with ferrous compounds and water, comprising:
   washing the material with a solution containing ferrous ions ($Fe^{++}$);
   oxidizing the material under controlled conditions with respect to nature and amount of an oxidizing agent, temperature and pH; and, optionally,
   subjecting the materials to a thermal after-treatment, whereby stabilizing ferric oxides are formed on the material.

2. The method as claimed in claim 1, wherein the solution allows for the formation of stabilizing ferric oxides ($Fe^{+++}$) in the washing solution.

3. The method as claimed in claim 1, wherein by said washing of the material a dissolution of soluble salts takes place, whereby the same solution is used for washing as well as for stabilization of the material.

4. The method as claimed in claim 1, wherein the oxidizing step is carried out by means of at least one of air, oxygen, oxygen containing flue gas, hydrogen peroxide, ozone, chlorine, permanganate and dichromate.

5. The method as claimed in claim 1, wherein the oxidation is carried out under controlled temperature conditions in an interval from 0 to 1200° C.

6. The method as claimed in claim 1, wherein the oxidation is carried out under controlled pH conditions in an interval from 5 to 12, the pH value being adjusted as required.

7. The method as claimed in claim 6, wherein the oxidation is carried out under controlled pH conditions in the interval from 8 to 12.

8. The method as claimed in claim 1, wherein a first product formed by precipitation in the washing solution is handled together with a second product formed by stabilization of the material.

9. The method as claimed in claim 1, in which all or part of the materials are treated together or separately by washing and stabilization, wherein one or more of said stabilized products are subsequently subjected to a thermal after-treatment for obtaining a sintering or melting of the stabilized products.

10. The method as claimed in claim 9, wherein the thermal after-treatment is carried out in a temperature interval between 800° C. and 1300° C.

11. The method as claimed in claim 9, wherein the thermal after-treatment is carried out in an incinerator for obtaining sintering together or melting together with the slag formed in the incinerator.

12. The method as claimed in claim 11, wherein the incinerator comprises a rotary kiln and the stabilized product is passed to an inlet thereof.

13. The method as claimed in claim 11, wherein the stabilized product is passed to the incinerator through a feeding system for grate screenings.

14. A method as claimed in claim 1, wherein the washing and stabilization is part of a system for the returning of grate screenings.

15. The method as claimed in claim 1, wherein the ferrous compound comprises at least one of ferrous sulfate and ferrous chloride.

16. The method as claimed in claim 15, wherein the ferrous compound contains from 2 to 50 grams of $Fe^{++}$ per liter.

17. The method as claimed in claim 15, wherein in connection with chemical stabilization with ferrous compounds there is additionally carried out a stabilization with other chemicals comprising at least one silicon (Si), aluminum (Al) and phosphate ($PO_4^{-3}$).

18. A method as claimed in claim 1, wherein said steps of washing and forming are carried out batchwise in a continuous system or in situ on already deposited or fixed material.

19. A method as claimed in claim 1, further comprising combining the stabilization material with another coating of known type with material selected from the group consisting of cement, fly ash and lime.

20. A method as claimed in claim 1, wherein materials of industrial dust, contaminated soil or other materials are treated alone or together with other materials for stabilization with ferric oxide.

21. A plant for carrying out the method as claimed in claim 1, comprising a silo containing materials containing environmentally noxious constituents; a reactor to which said materials are fed; a tank and a return water tank and silos containing ferrous salt solution and, optionally, other chemicals, washing-water and the chemicals being fed to said reactor; means for stirring the reactor contents; a sedimentation tank to which the washing water is fed; a centrifuge or filter press in which the precipitate formed is dewatered; and means for aerating the water in the tank for decreasing the pH and oxidation of the water.

22. A plant as claimed in claim 21, wherein the reactor, the return tank or a drying and oxidation station is provided for returning a precipitate formed in the tank.

23. A plant as claimed in claim 21, further comprising means for returning the treated material to an incinerator plant.

24. A plant as claimed in claim 22, further comprising means for carrying out the oxidation in a separate drying plant in the station.

* * * * *